United States Patent [19]
Koch

[11] 3,975,295
[45] Aug. 17, 1976

[54] LIQUID AMINE COMPOSITIONS

[75] Inventor: S. Don Koch, Tulsa, Okla.

[73] Assignee: Ashland Oil, Inc., Ashland, Ky.

[22] Filed: Aug. 26, 1974

[21] Appl. No.: 500,234

Related U.S. Application Data

[63] Continuation-in-part of Ser. No. 256,082, May 23, 1972.

[52] U.S. Cl. .................................. 252/357; 252/61; 252/363.5
[51] Int. Cl.² ...................... B01F 17/16; B03D 1/02
[58] Field of Search ................. 252/357, DIG. 1, 61, 252/548, 363.5; 260/584 B, 584 C

[56] References Cited
UNITED STATES PATENTS

| | | | |
|---|---|---|---|
| 2,371,292 | 3/1945 | Hoag | 252/61 |
| 2,816,870 | 12/1957 | Lentz et al. | 252/61 |
| 2,880,458 | 5/1959 | Ceintry | 106/277 |
| 2,930,761 | 3/1960 | Charret | 252/357 X |
| 3,444,090 | 5/1969 | Michal | 252/61 X |

Primary Examiner—Benjamin R. Padgett
Assistant Examiner—David Leland

[57] ABSTRACT

Surface active compositions useful as cationic emulsifiers, flotation agents, corrosion inhibitors and the like are provided in the form of an admixture of a long chain aliphatic primary mono-amine or a similarly substituted trimethylenediamine and an alkoxylated derivative of said mono-amine. Additionally disclosed are the alcoholic concentrates of the aforesaid compositions. Such compositions and concentrates thereof are characterized in being homogenous liquids further exhibiting freeze-thaw stability and excellent dispersibility in water at ambient temperatures for forming their acid salts.

14 Claims, No Drawings

LIQUID AMINE COMPOSITIONS

CROSS-REFERENCE TO RELATED APPLICATION

This application is a continuation-in-part of application Ser. No. 256,082; filed May 23, 1972.

BACKGROUND OF THE INVENTION

1. Field of the Invention

This invention relates to surface active compositions of the type wherein the surface compounds are composed of a cation active amine or trimethylene diamine moiety attached to one large hydrophobic group.

2. Description of the Prior Art

The long chain aliphatic primary amines and the long chain aliphatic N-substituted trimethylene diamines represent important classes of commodity chemicals having widespread utility in a variety of applications. Foremost of these conventional applications include, for example, the preparation of cationic asphalt emulsions for use in road construction; hydrometallurgical operations wherein such amines serve as effective froth flotation agents; and also in the oil industry which extensively makes use of the amines as metal corrosion inhibitors and wetting agents in general.

In the use applications noted above, as well as most others, a problem arises in the handling of said amines inasmuch as they are solid pastelike materials at the prevailing ambient temperatures. In order to obviate this handling difficulty, the obvious expendiency would be to market the amines in the form of a solution in an inert organic solvent. However, it has proven to be very difficult to obtain solutions thereof economically which in turn possess a required degree of freeze-thaw stability. Moreover, suitable solutions of this type are invariably "red label" products and thus suffer on this score.

It is known that the lower alkoxylated derivatives of the aforesaid amines are liquid materials which to an extent retain the surface active properties associated with the cation active amine base. Nonetheless, the sacrifice of surface properties resulting by virtue of such modification detracts from the attractiveness of this approach to provide liquid compositions.

OBJECT OF THE INVENTION

The principal objective of this invention is to provide neat surface active compositions containing a substantial proportion of a cation active amine or high flash point alcoholic concentrates thereof which compositions and concentrates are liquid, freeze-thaw stable materials at ambient temperatures capable of being readily dispersed in cool water for forming the acid salts thereof for utilization in emulsification and flotation applications.

SUMMARY OF THE INVENTION

In accordance with the present invention it has been found that a normally-solid cation active amine of the type $RNH_2$ or $RNHCH_2CH_2CH_2NH_2$ wherein R represents a $C_{12}$-$C_{22}$ aliphatic hydrocarbon group, can be admixed in substantial amounts with a 1–15 mole lower alkylene oxide condensate of said mono-amine to provide homogenous liquid compositions at ambient temperatures which compositions further exhibit freeze-thaw stability. In a narrower aspect of the invention, clear liquid compositions of like components are provided in the form of concentrated solutions thereof in a $C_1$–$C_{12}$ alkanol wherein either said primary amine or diamine component constitutes a major portion of the active content.

DESCRIPTION OF THE PREFERRED EMBODIMENTS

As mentioned, the long chain aliphatic N-substituted mono- and diamines useful in the practice of this invention are readily available commercial products. The applicable mono-amines are customarily produced by reacting a long chain fatty acid or mixture thereof with ammonia at an elevated temperature to provide the corresponding nitrile intermediate which is then catalytically reduced in the presence of hydrogen. The indicated diamines in turn are obtained by cyanoethylating the long chain primary amines referred to followed by similarly reducing the resultant adduct.

Examples of the aliphatic substituents of the aforesaid amines include dodecyl, tridecyl, tetradecyl, pentadecyl, hexadecyl, octadecyl, eicosyl, docosyl, octadecanyl, octadecadienyl, octadecatrienyl, etc. In general, the commercial amines and diamines having the above-enumerated types of aliphatic substituents are derived from the fatty acids obtained from the naturally occurring triglyceride esters such as tallow, soybean oil, cotton-seed oil, coconut oil and the like. Still another suitable source of fatty acids for producing such amines is tall oil. Accordingly, the amines and diamines derived from these sources will contain an aliphatic moiety corresponding in carbon atom content and saturation to that of the acyl residues of the oil from whence obtained. For most applications wherein the aforesaid amines are used as emulsifiers, flotation agents and the like, the tallow amines and diamines are preferred.

The solubilizing component of the surface active compositions of this invention are the addition products or adducts obtained by reacting the monoamine as described hereinabove, with from 1 to 15 moles of a lower alkylene oxide. The preferred alkylene oxides are ethylene and propylene oxide of which the latter is especially preferred. The preferred adducts are those obtained by reacting a mono-amine as described above; particularly tallow amine, with about two moles of propylene oxide. The adduction reaction can be conveniently carried out by mixing the selected amine with the alkylene oxide, specifically propylene oxide, in the desired molar ratio and heating same at a temperature between about 100° and 300°C, preferably in a sealed reaction vessel. The reaction is completed upon the substantial subsidence of autogenous pressure which indicates that the alkylene oxide has reacted to provide near quantitative yields of the addition product. At the indicated temperature range, the reaction time required is generally less than 3 hours.

In preparing the compositions to which this invention is directed, the mono or diamine component, as the case may be, is mixed with the alkoxylated product to effect a homogenous combination thereof. The contemplated compositions broadly include those containing from 10 to 90 parts of the mono- or diamine and correspondingly from 90 to 10 parts of the amine adduct solubilizer. A preferred weight ratio range of the amine or diamine to the solubilizing component, however, is between 40:60 and 60:40, respectively.

A further embodiment of the invention is directed to the alcoholic solution concentrates of the hereinabove described compositions. The practice of this embodiment permits one to increase the ratio of amine or diamine to the solubilizing component without sacrifice of homogenuity, freeze-thaw stability and cold water dispersibility in forming the acid salts. A further advantage of this embodiment is that it permits the use of a one mole adduct of the monoamine as the solubilizer. This is so because such a product possesses too high a melting point for obtaining the neat compositions in accordance with this invention. Suitable alkanols for this purpose are the $C_1$–$C_{12}$ alkanols. The solids content of these concentrates should desirably be at least about 70%. For the purpose of obtaining high flash point concentrates of the foregoing type, the major amount of the alcoholic solvent should be an alkanol having at least six carbon atoms.

In order to further illustrate the present invention, the following example is set forth. All percentages given are on a weight basis.

EXAMPLE

The physical characteristics of representative compositions in accordance with this invention based on the tallow derivatives preferred herein are outlined in the following Table I. The tallow diamine component per se is a paste at room temperature whereas the tallow amine adduct solubilizer ranges from a cloudy viscous liquid to a fluid clear liquid at room temperature. Said adducts were prepared by reacting one mole of tallow mono-amine with the indicated number of moles of propylene oxide according to the procedure described hereinabove.

TABLE I

| Amine Compositions | Cloud Point °F | Physical Characteristics Room Temperatures | After Freeze-Thaw |
|---|---|---|---|
| 10% tallow diamine 90% tallow I° Amine + 1 P.O. | 90%° | Solid | Solid |
| 10% tallow diamine 90% tallow I° Amine + 2 P.O. | 60° | Clear Liquid | Clear Liquid |
| 10% tallow diamine 90% tallow I° Amine + 4 P.O. | 39.2 | V. Slt. Cloud | Clear Liquid |
| 40% tallow diamine 60% tallow I° Amine + 1 P.O. | 88° | Solid | Solid |
| 40% tallow diamine 60% tallow I° Amine + 2 P.O. | 70° | V. Slt. Cloud | V. Slt. Cloud |
| 40% tallow diamine 60% tallow I° Amine + 4 P.O. | 70° | V. Slt. Cloud | Heavy Cloud |
| 40% tallow diamine 30% tallow I° Amine + 1 P.O. 30% Isopropanol | 50° | Clear Liquid | V. Slt. Cloud |
| 40% tallow diamine 30% tallow I° Amine + 2 P.O. 30% Isopropanol | 44 | Clear Liquid | Clear Liquid |
| 40% tallow diamine 30% tallow I° Amine + 4 P.O. 30% Isopropanol | 48.2 | Clear Liquid | Clear Liquid |
| 40% tallow diamine 30% tallow I° Amine + 1 P.O. 20% $C_6$–$C_8$ alcohol 10% Isopropanol | 51.8 | Clear Liquid | Cloudy |
| 40% tallow diamine 30% tallow I° Amine + 2 P.O. 20% $C_6$–$C_8$ alcohol 10% Isopropanol | 42 | Clear Liquid | Clear Liquid |
| 40% tallow diamine 30% tallow I° Amine + 4 P.O. 20% $C_6$–$C_8$ alcohol 10% Isopropanol | 41 | Clear Liquid | V. Slt. Cloud |

What is claimed is:

1. A liquid, freeze-thaw stable surface active composition consisting essentially of from about 10 to 90 parts by weight of (1) a $C_{12}$–$C_{22}$ aliphatic primary mono-amine or an N-substituted trimethylene diamine having the formula:

$$RNHCH_2CH_2CH_2NH_2$$

wherein R is a $C_{12}$–$C_{22}$ aliphatic hydrocarbon group; and correspondingly from 90 to 10 parts of (2) a 2–15 mole lower alkylene oxide adduct of said aliphatic primary mono-amine.

2. A composition in accordance with claim 1 wherein said lower alkylene oxide is propylene oxide and wherein component (2) is a 2–4 mole adduct of said $C_{12}$–$C_{22}$ aliphatic primary mono-amine.

3. A composition in accordance with claim 2 wherein component (2) is about a two mole adduct of said mono-amine.

4. A composition in accordance with claim 3 wherein the weight ratio of (1) to (2) is between about 40:60 and 60:40 respectively.

5. A composition in accordance with claim 4 wherein component (1) is tallow amine or tallow trimethylene diamine.

6. A composition in accordance with claim 5 wherein component (2) is the adduct of tallow amine.

7. Solutions of compositions in accordance with claim 6 in a $C_1$–$C_{12}$ alkanol or mixtures thereof wherein the solids content is at least about 70%.

8. Solutions of compositions in accordance with claim 7 in mixtures of said alkanols containing a major amount of an alkanol having at least six carbon atoms.

9. A liquid, freeze-thaw stable $C_1$–$C_{12}$ alkanol solution of at least about 70% solids content wherein said solids consist essentially of from about 10 to 90 parts by weight of (1) a $C_{12}$–$C_{22}$ aliphatic primary mono-amine or an N-substituted trimethylene diamine having the formula:

$$RNHCH_2CH_2CH_2NH_2$$

wherein R is a $C_{12}$–$C_{22}$ aliphatic hydrocarbon group; and correspondingly from 90 to 10 parts of (2) a 1–15 mole lower alkylene oxide adduct of said aliphatic primary mono-amine.

10. A liquid, freeze-thaw stable composition in accordance with claim 9 wherein the weight ratio of (1) to (2) is between about 40:60 and 60:40, respectively.

11. A liquid, freeze-thaw stable composition in accordance with Claim 10 wherein component (1) is said N-substituted trimethylene diamine.

12. A liquid, freeze-thaw stable composition in accordance with Claim 11 wherein the N-substituted trimethylene diamine is tallow trimethylene diamine.

13. A liquid, freeze-thaw stable composition in accordance with Claim 12 wherein component (2) is the propylene oxide adduct of said aliphatic primary monoamine.

14. A liquid, freeze-thaw stable composition in accordance with Claim 13 wherein component (2) is about a two mole adduct of tallow amine.

* * * * *